United States Patent
Li et al.

(10) Patent No.: US 12,477,536 B2
(45) Date of Patent: Nov. 18, 2025

(54) SCHEDULE TRANSMISSION OF PHYSICAL UPLINK SHARED CHANNEL (PUSCH) ON AN UNLICENSED BAND

(71) Applicant: VIVO MOBILE COMMUNICATION CO., LTD., Dongguan (CN)

(72) Inventors: Na Li, Dongguan (CN); Gen Li, Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 392 days.

(21) Appl. No.: 18/150,291

(22) Filed: Jan. 5, 2023

(65) Prior Publication Data
US 2023/0148270 A1  May 11, 2023

Related U.S. Application Data

(63) Continuation of application No. PCT/CN2021/106439, filed on Jul. 15, 2021.

(30) Foreign Application Priority Data

Jul. 16, 2020 (CN) .......................... 202010688118.3

(51) Int. Cl.
*H04W 72/1268* (2023.01)
*H04W 16/14* (2009.01)
*H04W 72/23* (2023.01)

(52) U.S. Cl.
CPC ....... *H04W 72/1268* (2013.01); *H04W 16/14* (2013.01); *H04W 72/23* (2023.01)

(58) Field of Classification Search
CPC . H04W 72/1268; H04W 72/23; H04W 16/14; H04W 72/04; H04W 72/12;
(Continued)

(56) References Cited

U.S. PATENT DOCUMENTS

2019/0159213 A1* 5/2019 Baldemair ............ H04L 5/0053
2019/0394759 A1* 12/2019 Ying ..................... H04L 1/0061
(Continued)

FOREIGN PATENT DOCUMENTS

CN 110913488 * 3/2020
CN 110913488 A 3/2020
(Continued)

OTHER PUBLICATIONS

China National Intellectual Property Administration, International Search Report issued in corresponding Application No. PCT/CN/2021/106439, mailed Sep. 28, 2021.
(Continued)

*Primary Examiner* — Mewale A Ambaye
(74) *Attorney, Agent, or Firm* — The Webb Law Firm (57) ABSTRACT

A resource determining method and apparatus, and a terminal are disclosed. The solution includes: receiving first DCI, where the first DCI is in a non-fallback DCI format, and at least one row index in a time domain resource allocation list associated with the non-fallback DCI format indicates time domain transmission resources of a plurality of physical uplink shared channels PUSCHs; and the first DCI is used for scheduling transmission of the PUSCHs on an unlicensed band; and determining a time domain resource allocation list used for transmitting the PUSCHs according to the following content: whether the transmission scheduled by the first DCI is first transmission or retransmission and a scrambling identifier of the first DCI.

20 Claims, 3 Drawing Sheets

Receive first DCI — 21

Determine a time domain resource allocation list used for transmitting the PUSCHs according to the following content: whether the transmission scheduled by the first DCI is first transmission or retransmission and a scrambling identifier of the first DCI — 22

(58) Field of Classification Search
CPC ....... H04W 75/54; H04W 7/02; H04W 76/11; H04W 76/27; H04L 1/16
See application file for complete search history.

(56) References Cited

U.S. PATENT DOCUMENTS

| | | | |
|---|---|---|---|
| 2023/0209538 A1* | 6/2023 | Cirik | H04W 72/231 370/329 |
| 2023/0344580 A1* | 10/2023 | Sohrabi | H04L 5/0048 |
| 2024/0155604 A1* | 5/2024 | Maamari | H04W 72/1268 |
| 2024/0323973 A1* | 9/2024 | Cirik | H04W 72/231 |
| 2024/0340115 A1* | 10/2024 | Elshafie | H04W 72/1268 |

FOREIGN PATENT DOCUMENTS

| | | | |
|---|---|---|---|
| CN | 111278131 A | 6/2020 | |
| KR | 1020200060255 A | 5/2020 | |
| WO | 2019/246451 A1 | 12/2019 | |

OTHER PUBLICATIONS

TSG-RAN WG1 #94. Gothenburg, Sweden, Aug. 20-24, 2018. R1-1809702. Ericsson. Summary of 7.1.3.3 (resource allocation). See: ISR.

Huawei, "Feature lead summary #1 on NR-U HARQ", 3GPP TSG RAN WG1 Meeting #101-e, e-Meeting, May 25-Jun. 5, 2020, R1-2004692.

\* cited by examiner

| Row index | PUSCH mapping type | $K_2$ | #1 | | #2 | | #3 | |
|---|---|---|---|---|---|---|---|---|
| | | | S | L | S | L | S | L |
| 1 | Type A | 1 | 0 | 4 | N/A | N/A | N/A | N/A |
| 2 | Type A | 1 | 0 | 4 | 4 | 4 | 8 | 4 |
| 3 | Type A | 1 | 0 | 4 | 4 | 5 | 9 | 4 |
| ... | | | | | | | | |

SCHEDULE TRANSMISSION OF PHYSICAL UPLINK SHARED CHANNEL (PUSCH) ON AN UNLICENSED BAND

CROSS-REFERENCE TO RELATED APPLICATIONS

This application is a continuation of International Application No. PCT/CN2021/106439, filed on Jul. 15, 2021, which claims priority to Chinese Patent Application No. 202010688118.3 filed on Jul. 16, 2020, which is incorporated herein by reference in its entirety.

TECHNICAL FIELD

This application relates to the field of communication technologies, and specifically, to a resource determining method and apparatus, and a terminal.

BACKGROUND

In the related art, DCI in a non-fallback downlink control information (DCI) format may be supported to schedule transmission of physical uplink shared channels (PUSCH) on an unlicensed band. However, in this case, a time domain resource allocation list used for transmitting the PUSCH is still unclear.

SUMMARY

According to a first aspect of the present disclosure, a resource determining method is provided, applied to a terminal, which includes:
  receiving first DCI, where the first DCI is in a non-fallback DCI format, and at least one row index in a time domain resource allocation list associated with the non-fallback DCI format indicates time domain transmission resources of a plurality of PUSCHs; and the first DCI is used for scheduling transmission of the PUSCHs on an unlicensed band; and
  determining a time domain resource allocation list used for transmitting the PUSCHs according to the following content: whether the transmission scheduled by the first DCI is first transmission or retransmission and a scrambling identifier of the first DCI.

According to a second aspect of the present disclosure, a resource determining apparatus is provided, applied to a terminal, which includes:
  a receiving module, configured to receive first DCI, where the first DCI is in a non-fallback DCI format, and at least one row index in a time domain resource allocation list associated with the non-fallback DCI format indicates time domain transmission resources of a plurality of PUSCHs; and the first DCI is used for scheduling transmission of the PUSCHs on an unlicensed band; and
  a determining module, configured to determine a time domain resource allocation list used for transmitting the PUSCHs according to the following content: whether the transmission scheduled by the first DCI is first transmission or retransmission and a scrambling identifier of the first DCI.

According to a third aspect of the present disclosure, a terminal is provided, which includes a processor, a memory, and a program or instruction stored in the memory and executable on the processor, where when the program or instruction is executed by the processor, the steps of the resource determining method according to the first aspect are implemented.

According to a fourth aspect of the present disclosure, a readable storage medium is provided, storing a program or instruction, where when the program or instruction is executed by a processor, the steps of the resource determining method according to the first aspect are implemented.

According to a fifth aspect of the present disclosure, a chip is provided, including a processor and a communication interface, where the communication interface is coupled to the processor, the processor is configured to execute a program or instruction, to implement the resource determining method according to the first aspect.

DETAILED DESCRIPTION

The following clearly describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application without creative efforts shall fall within the protection scope of this application.

In this specification and claims of this application, the terms "first", "second", and so on are intended to distinguish between similar objects but do not indicate a particular order or sequence. It should be understood that the data termed in such a way are interchangeable in proper circumstances, so that the embodiments of this application can be implemented in other orders than the order illustrated or described herein. In addition, the objects distinguished by "first" and "second" generally belong to the same type, and the number of the objects are not limited, where for example, there may be one or a plurality of first objects. In addition, "and/or" in this specification and claims represents at least one of connected objects. The character "/" generally indicates an "or" relationship between associated objects.

It should be noted that, the technologies described in the embodiments of this application are not limited to a long term evolution (LTE)/LTE-advanced (LTE-A) system, and may further be applied to other wireless communication systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems.

The terms "system" and "network" in the embodiments of this application may generally be used interchangeably. The technologies described in this application may be applied to the systems and wireless technologies mentioned above, and may also be applied to other systems and wireless technologies. However, the following describes a new radio (NR) system for the purpose of illustration, and NR terms are used in most of the following descriptions, although the technologies may also be applied to applications other than NR system applications, such as a $6^{th}$ generation (6G) communication system.

Figure 1:
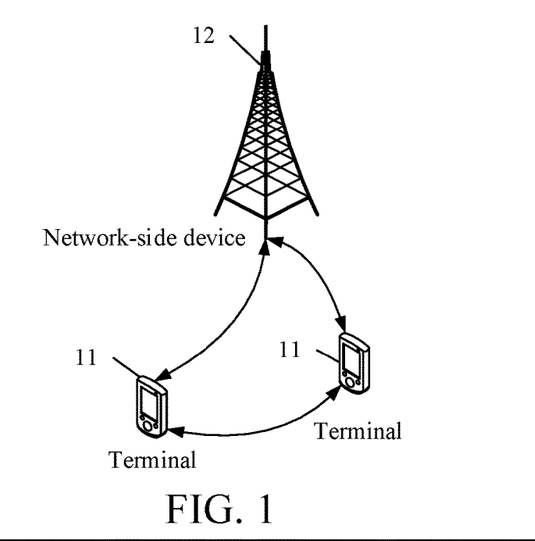
FIG. 1 is a block diagram of a wireless communication system according to an embodiment of this application.

FIG. 1 shows a block diagram of a wireless communication system to which the embodiments of this application may be applied. The wireless communication system includes terminals 11 and a network-side device 12. The terminal 11 may also be referred to as a terminal device or user equipment (UE). The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a bracelet, an earphone, or glasses. It should be noted that, a specific type of the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a B node, an evolved B node (eNB), a home B node, a home evolved B node, a WLAN access point, a Wi-Fi node, a transmitting receiving point (TRP), or any suitable term in the field, provided that a same technical effect can be reached, and the base station is not limited to a specific technical term. It should be noted that, the base station in the NR system is only used as an example in the embodiments of this application, but a specific type of the base station is not limited.

For ease of understanding of the embodiments of this application, the following content is first described.

In a future communication system, an unlicensed band may serve as a supplement to a licensed band to help an operator to expand services. The unlicensed band is shared by a plurality of radio access technologies (RAT), such as Wi-Fi, radar, and LTE-based licensed-assisted access (LTE-LAA). Therefore, in some nations or regions, the unlicensed band needs to conform to supervision regulations during use to ensure that all devices can share the resource uniformly, such as a listen before talk (LBT) channel or a maximum channel occupancy time (MCOT). In a case that a transmission node needs to transmit information, the transmission node is required to first execute LBT on a specified radio channel, to perform energy detection (ED) on a surrounding wireless transmission environment. In a case that energy is lower than a specific threshold, the channel is determined as idle, and transmission may be started in this case. Otherwise, the channel is determined as busy, and the transmission node cannot perform transmission. The transmission node may be a base station, UE, or a Wi-FI AP. After transmission is started, a channel occupancy time of the transmission node cannot exceed the MCOT.

Uplink transmission manners may be divided into dynamic grant based (dynamic grant based) and configured grant based (configured grant based). Further, configured grant (CG) uplink transmission is also divided into two sub-types: a Type 1 (for example, configured grant Type 1 PUSCH transmission, Type 1 PUSCH transmission with a configured grant) and a Type 2 (for example, configured grant Type 2 PUSCH transmission, Type 2 PUSCH transmission with a configured grant). All transmission parameters of the Type 1 PUSCH transmission with a configured grant are configured by a high layer in a semi-persistent manner, and transmission resources thereof appear periodically. Transmission parameters of the Type 2 PUSCH transmission with a configured grant are configured and indicated by the high layer and a physical layer jointly. The high layer mainly configures a cycle of the transmission resources in a semi-persistent manner, and the physical layer mainly indicates the transmission parameters such as a modulation and coding scheme (MCS), specific time-frequency resources, and the number of transmission layers.

It should be noted that, CG PUSCH retransmission may be scheduled based on DCI. That is, a fallback DCI format such as DCI format 0_0 and a non-fallback DCI format such as DCI format 0_1 may be both used to schedule CG PUSCH retransmission. Cyclic redundancy check (CRC) of the DCI format 0_0 and the DCI format 0_1 is scrambled by using a configured scheduling-radio network temporary identifier (CS-RNTI), and a value of a new data indication field in the DCI is set to 1. In a case that the CG PUSCH retransmission is scheduled by the DCI, parameters other than parameters related to uplink power and a modulation and coding scheme of high-layer parameters thereof are parameters of a CG PUSCH, and other parameters are parameters of a DG PUSCH, so that the CG PUSCH retransmission may be considered as dynamically scheduled transmission.

For an uplink repetition transmission type, a slot-based repetition transmission mechanism is referred to as a PUSCH repetition Type A, that is, K repetition transmissions need to occupy K slots, and time resources (a starting position of transmission) occupied by data transmission in each slot are the same. In a case that the number of repetition transmissions is greater than 1, data can be transmission only by 1 layer (single-layer). A sub-slot based repetition transmission mechanism is referred to as a PUSCH repetition Type B, that is, K nominal repetition (nominal repetition) transmissions may be continuously transmitted in a "back to back" manner in one slot. In a case that time domain resources of one nominal transmission need to cross a boundary of a slot or an invalid or unavailable resource or symbol such as a downlink symbol exists in the time domain resources, the nominal transmission may be divided into a plurality of actual repetition (actual repetition) transmissions by the slot or the invalid resource or symbol.

1) For time domain resource allocation of a single PUSCH (Single-PUSCH) on an unlicensed band (for example, NR-U), in a case that an activated or scheduled DCI format (format) is a fallback (fallback) DCI format, namely, the DCI format 0_0, the terminal can only transmit 1 PUSCH no matter the PUSCH is a DG PUSCH or a CG PUSCH. Correspondingly, each row in a time domain resource allocation list configured by the high layer only determines time domain resources of a single PUSCH.

Further, for a Type 1 CG PUSCH, time domain resources of the CG PUSCH are determined by a high-layer parameter timeDomainallocation, and a value m of timeDomainallocation provides a row index m+1 pointing to a determined time domain resource allocation list (whether the time domain resource allocation list is associated with the DCI format 0_0 or the DCI format 0_1 is determined according to other high-layer parameters of the Type 1 CG PUSCH).

For a Type 2 CG PUSCH, time domain resources of the CG PUSCH are determined by a time domain resource assignment field (Time domain resource assignment field) in an activated DCI format, and a determined time domain resource allocation list is associated with the activated DCI format. That is, in a case that the activated DCI is the DCI format 0_0, the time domain resource allocation list is a time domain resource allocation list configured by the high layer and associated with the DCI format 0_0; and in a case that the activated DCI is the DCI format 0_1, the time domain resource allocation list is a time domain resource allocation list configured by the high layer and associated with the DCI format 0_1.

2) For time domain resource allocation of dynamical grant (DG) multiple PUSCHs (Multi-PUSCH) on an unlicensed band (for example, NR-U), the Multi-PUSCH is scheduled by single DCI and can only use a non-fallback DCI format (non-fallback DCI format), namely, another uplink DCI format(s) such as the DCI format 0_1 other than the DCI format 0_0. By scheduling one to a plurality of PUSCHs that are continuous in time, overheads of the base station issuing DCI may be reduced, a requirement for the UE to execute LBT is reduced, and a requirement for introducing a plurality of uplink and downlink switching points in a channel occupancy time (COT) initiated by the base station may be also reduced.

A time domain resource allocation list associated with the non-fallback DCI format such as DCI format 0_1 (the DCI format 0_1 is used as an example herein, but this application is not limited thereto and is applicable to all non-fallback DCI formats) is configured by the high layer, each row in the time domain resource allocation list may determine time domain resource allocation of one to more PUSCHs (8 at most), and each PUSCH corresponds to one independent pair of start and length indicator values (SLIV) and a demodulation reference signal (DM-RS) mapping type (Mapping Type). A K2 parameter in each row indicates a slot offset between a slot in which a first PUSCH is located and a slot in which the scheduling DCI is located. The DCI format 0_1 indicates, by indicating an index of a row in the time domain resource allocation list configured by the high layer, that one to more PUSCHs determined by the row are scheduled, and the number of scheduled PUSCHs is determined by the number of valid SLIVs in the row.

3) For time domain resource allocation of a configured grant (CG) multi-PUSCHs on an unlicensed band (for example, NR-U), for Type1 CG PUSCH transmission and Type2 CG PUSCH transmission, a network side configures high-layer parameters cg-nrofSlots-r16 and cg-nrofPUSCH-InSlot-r16 for the terminal. The cg-nrofSlots-r16 indicates the number of continuous slots (slot) allocated in a CG cycle. The cg-nrofPUSCH-InSlot-r16 indicates the number of continuous CG-PUSCH candidate transmission positions allocated in a slot. The SLIV indicates a start symbol S and a transmission length L of a first CG PUSCH in a CG transmission slot. Transmission lengths of all continuous CG-PUSCH candidate transmission positions in a slot are the same. CG PUSCH candidate transmission positions and lengths in cg-nrofSlots-r16 continuous slots are the same, namely, transmission lengths of the Multi-PUSCHs are the same.

Transmission of a plurality of different CG PUSCHs may be supported under the unlicensed band (for example, NR-U), and time domain transmission lengths, namely, L of the plurality of different CG PUSCHs are the same. In addition, transmission of a plurality of different DG PUSCHs may be also supported, but time domain transmission lengths of the plurality of different DG PUSCHs may be different. That is, in the configured time domain resource allocation list associated with the DCI format 0_1, an independent pair of (S, L) are allocated for each scheduled PUSCH, and L of a plurality of PUSCHs may be different.

Therefore, in addition to resolving the foregoing problem to be resolved, this application further needs to resolve the following specific problems: 1) in a case that CG PUSCHs or PUSCHs carrying semi-persistent channel state information (SP-CSI) activate and use the DCI format 0_1, a time domain resource allocation list (a DCI format with which the time domain resource allocation list is associated) indicated by a time domain resource assignment field in the activated DCI for ensuring that transmission lengths of different CG PUSCHs or PUSCHs carrying SP-CSI are the same is still unclear currently. 2) When the DCI format 0_1 is used for retransmission of CG PUSCHs, whether corresponding DCI can schedule retransmission of a plurality of different CG PUSCHs or retransmission of only one CG PUSCH is still unclear currently, and a time domain resource allocation list (a DCI format with which the time domain resource allocation list is associated) for retransmission of the scheduled one or a plurality of CG-PUSCHs is also unclear.

For coexistence of a time domain resource allocation list for multiple PUSCHs (PUSCH-TimeDomainResourceAllocationListForMultiPUSCH) and a time domain resource allocation list of the DCI format 0_1 (pusch-TimeDomainAllocationList-ForDCIformat0_1), the embodiments of this application may include, but not limited to, any case of the following:

Case 1: The high layer is not supported to configure the PUSCH-TimeDomainResourceAllocationListForMultiPUSCH and the pusch-TimeDomainAllocationList-ForDCIformat0_1 simultaneously.

Case 2: In a case that a repetition type of the pusch-TimeDomainAllocationList-ForDCIformat0_1 configured by the high layer is the PUSCH repetition Type B, the high layer is not supported to configure the PUSCH-TimeDomainResourceAllocationListForMultiPUSCH and the pusch-TimeDomainAllocationList-ForDCIformat0_1 simultaneously; or otherwise, the high layer can configure the PUSCH-TimeDomainResourceAllocationListForMultiPUSCH and the pusch-TimeDomainAllocationList-ForDCIformat0_1 simultaneously.

Case 3: In a case that a repetition type of the pusch-TimeDomainAllocationList-ForDCIformat0_1 configured by the high layer is the PUSCH repetition B or the PUSCH repetition type A, and the high layer configures the number of repetition (numberofrepetition) in the time domain resource allocation list, the high layer is not supported to configure the PUSCH-TimeDomainResourceAllocationListForMultiPUSCH and the pusch-TimeDomainAllocationList-ForDCIformat0_1 simultaneously; or otherwise, the high layer can configure the PUSCH-TimeDomainResourceAllocationListForMultiPUSCH and the pusch-TimeDomainAllocationList-ForDCIformat0_1 simultaneously.

The resource determining method provided in the embodiments of this application is described in detail below through specific embodiments and application scenarios thereof with reference to the accompanying drawings.

Figure 2:
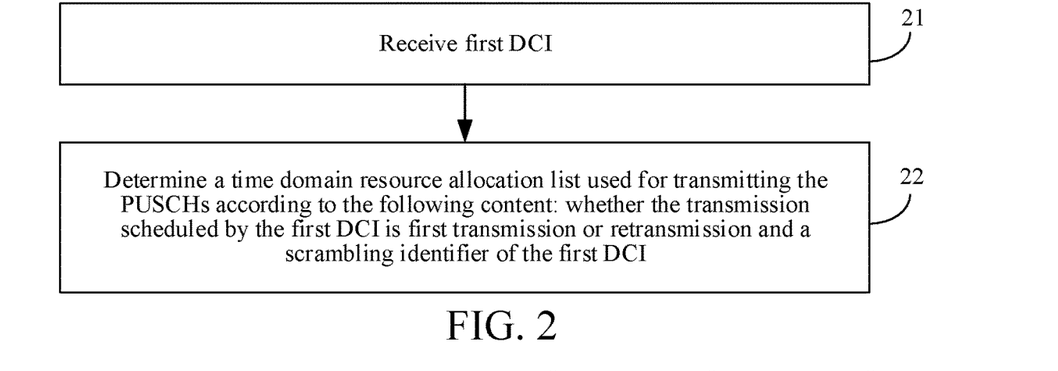
FIG. 2 is a flowchart of a resource determining method according to an embodiment of this application.

Referring to FIG. 2, FIG. 2 is a flowchart of a resource determining method according to an embodiment of this application. The method is applied to a terminal, and as shown in FIG. 2, the method includes the following steps:

Step 21: Receive first DCI.

The first DCI is in a non-fallback DCI format, and at least one row index in a time domain resource allocation list associated with the non-fallback DCI format indicates time domain transmission resources of a plurality of PUSCHs. The first DCI is used for scheduling transmission of the PUSCHs on an unlicensed band.

Step 22: Determine a time domain resource allocation list used for transmitting the PUSCHs according to the following content: whether the transmission scheduled by the first DCI is first transmission or retransmission and a scrambling identifier of the first DCI.

It should be noted that, the scrambling identifier of the first DCI includes, but not limited to, a CS-RNTI or an SP-SCI-RNTI. In a case that the scrambling identifier of the first DCI is the CS-RNTI, the first DCI may activate or schedule transmission of CG PUSCHs. In a case that the scrambling identifier of the first DCI is the SP-CSI-RNTI, the first DCI may activate or schedule transmission of PUSCHs carrying SP-CSI.

According to the resource determining method in this embodiment of this application, after the first DCI is received, the terminal may determine the time domain resource allocation list used for transmitting the PUSCHs according to whether the transmission scheduled by the first DCI is first transmission or retransmission and/or the scrambling identifier of the first DCI. Therefore, the time domain resource allocation list used for transmitting the PUSCHs may be clear.

In an implementation, for a case that a band (band) configured with the cg-nrofPUSCH-InSlot-r16 and the cg-nrofSlots-r16 and/or in which the Type 2 CG PUSCH is located is an unlicensed band, when the DCI in the non-fallback DCI format such as the DCI format 0_1 is used for activating the Type 2 CG PUSCH or a PUSCH carrying SP-CSI, and at least one row index in a time domain resource allocation list configured by the high layer and associated with the DCI format 0_1 indicates that time domain transmission resources (S, L) of PUSCHs of a plurality of different transport blocks (Transport Block, TB) are included, L of the plurality of different PUSCHs may be the same or may be different, and the UE may determine a time domain resource allocation list used for transmitting the PUSCHs according to at least one of the following:

1) a type of a running band (whether the band is an unlicensed band or a shared spectrum channel access (shared spectrum channel access));
2) a specific RRC parameter (for example, the cg-nrof-PUSCH-InSlot-r16 or the cg-nrofSlots-r16): whether to configure the parameter or whether a value of the parameter is a specific value;
3) the scrambling identifier of the DCI, for example, the CS-RNTI or the SP-CSI-RNTI; and
4) whether the transmission scheduled by the DCI is first transmission or retransmission.

In the embodiments of this application, in a case that the transmission scheduled by the first DCI is first transmission and the scrambling identifier of the first DCI is the CS-RNTI or the SP-CSI-RNTI, the terminal may determine to use a time domain resource allocation list associated with a non-fallback DCI format (namely, the DCI format of the first DCI) or determine to use a time domain resource allocation list associated with a fallback DCI format (DCI format 0_0). Optionally, the time domain resource allocation list associated with the DCI format 0_0 is a time domain resource allocation list associated with an uplink DCI format 0_0 received on a UE-specific search space (UE-specific search space).

Optionally, after determining to use the time domain resource allocation list associated with the non-fallback DCI format, the terminal may transmit CG PUSCHs or PUSCHs carrying SP-CSI by using at least one of the following:

1) Time domain transmission resources of a predefined PUSCH in the time domain resource allocation list associated with the non-fallback DCI format.

For example, after determining to use the time domain resource allocation list associated with the non-fallback DCI format, the user/terminal UE can only use time domain transmission resources of a predefined PUSCH, namely, S and L of a specific PUSCH, and ignore time domain transmission resources of other PUSCHs.

Optionally, the predefined PUSCH may be any one of the following:

I. a first PUSCH indicated by the time domain resource allocation list associated with the non-fallback DCI format; or
II. a first valid (valid) PUSCH indicated by the time domain resource allocation list associated with the non-fallback DCI format. That is, the time domain transmission resources of the PUSCH are not invalid due to other reasons, and the other reasons are that, for example, a downlink (DL) symbol or downlink transmission exists in the indicated time domain transmission resources, or the indicated time domain transmission resources are indicated as unavailable/invalid resources by signaling configured by another high layer or dynamically scheduled.

2) Time domain transmission resources of a PUSCH indicated by a first row index in the time domain resource allocation list associated with the non-fallback DCI format, where the first row index indicates time domain transmission resources of one PUSCH.

For example, after determining to use the time domain resource allocation list associated with the non-fallback DCI format, the user/terminal UE can only use a row index (row index) scheduling one PUSCH.

3) Time domain transmission resources of a PUSCH indicated by a second row index in the time domain resource allocation list associated with the non-fallback DCI format, where the second row index indicates time domain transmission resources of a plurality of PUSCHs, and transmission lengths of the plurality of PUSCHs are the same.

For example, after determining to use the time domain resource allocation list associated with the non-fallback DCI format, the user/terminal UE can only use a row index (row index) scheduling a plurality of PUSCHs with the same transmission length.

In this way, with the assistance of the foregoing three types of time domain transmission resources, it may be ensured that the transmission lengths of different CG PUSCHs or PUSCHs carrying SP-CSI are the same, and it can be further ensured that understandings of the network side and the terminal side on the used time domain resources are consistent while ensuring the network scheduling/configuration flexibility.

Optionally, cases that the terminal determines to use a time domain resource allocation list associated with a fallback DCI format may include any one of the following:

1) in a case that the time domain resource allocation list associated with the fallback DCI format is configured or the time domain resource allocation list associated with the non-fallback DCI format and the time domain resource allocation list associated with the fallback DCI format are configured simultaneously, determining to use the time domain resource allocation list associated with the fallback DCI format; or 2) in a case that a preset high-layer parameter is configured, determining to use the time domain resource allocation list associated with the fallback DCI format. The preset high-layer parameter limits the terminal to supporting the time domain resource allocation list associated with the non-fallback DCI format. In this case, only the fallback DCI format is supported to activate and/or deactivate uplink configuration transmission, the non-fallback DCI format is not supported to activate and/or deactivate the uplink configuration transmission, and the time domain resource allocation list associated with the fallback DCI format is used.

For example, for a case that a band configured with the cg-nrofPUSCH-InSlot-r16 and the cg-nrofSlots-r16 or in which the PUSCH is located is an unlicensed band, the terminal does not support DCI scrambled by the CS-RNTI/SP-CSI-RNTI to activate the transmission of CG-PUSCHs and PUSCHs carrying SP-SCI.

Figure 3A:
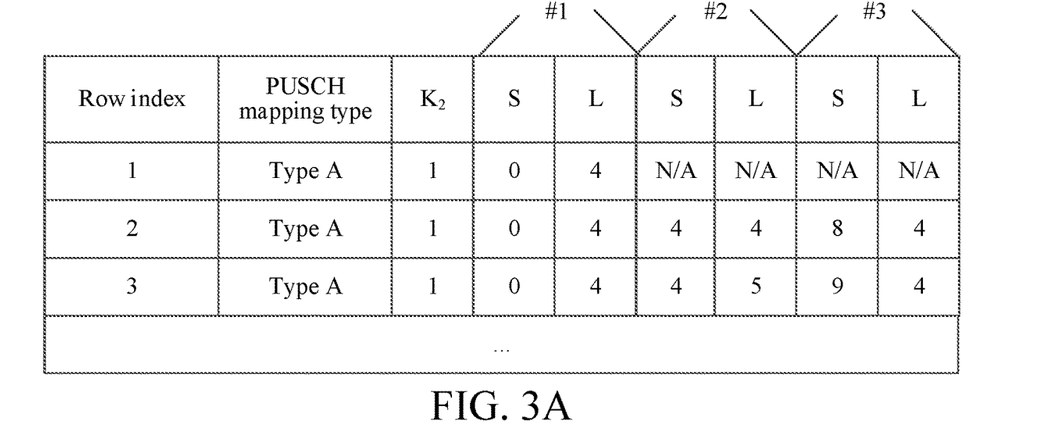
FIG. 3A is a schematic diagram of a time domain resource allocation list in an instance 1 of this application.

For example, in a case that the time domain resource allocation list associated with the DCI format 0_1 shown in FIG. 3A is used to transmit PUSCHs, the transmission may be performed by only selecting time domain transmission resources of one PUSCH indicated by a row index 1, or selecting time domain transmission resources of one PUSCH indicated by the row index 1 and time domain transmission resources of a plurality of PUSCHs with the same transmission length (L=4) indicated by a row index 2, or directly selecting the time domain resource allocation list associated with the DCI format 0_1.

In the embodiments of this application, in a case that the transmission scheduled by the first DCI is retransmission and the scrambling identifier of the first DCI is the CS-RNTI, in a case that one CG PUSCH that fails to be transmitted before is retransmitted or only retransmission of one CG PUSCH that fails to be transmitted before is supported, the terminal may determine to use a time domain resource allocation list associated with a non-fallback DCI format (namely, the DCI format of the first DCI) or determine to use a time domain resource allocation list associated with a fallback DCI format (DCI format 0_0).

Optionally, after determining to use the time domain resource allocation list associated with the non-fallback DCI format, the terminal may retransmit the CG PUSCH that fails to be transmitted before by using at least one of the following:

1) Time domain transmission resources of a predefined PUSCH in the time domain resource allocation list associated with the non-fallback DCI format.

For example, after determining to use the time domain resource allocation list associated with the non-fallback DCI format, the user/terminal UE can only use time domain transmission resources of a predefined PUSCH, namely, S and L of a specific PUSCH, and ignore time domain transmission resources of other PUSCHs.

Optionally, the predefined PUSCH may be any one of the following:

I. a first PUSCH indicated by the time domain resource allocation list associated with the non-fallback DCI format; or II. a first valid (valid) PUSCH indicated by the time domain resource allocation list associated with the non-fallback DCI format.

2) Time domain transmission resources of a PUSCH indicated by a first row index in the time domain resource allocation list associated with the non-fallback DCI format, where the first row index indicates time domain transmission resources of one PUSCH.

For example, after determining to use the time domain resource allocation list associated with the non-fallback DCI format, the user/terminal UE can only use a row index (row index) scheduling one PUSCH.

3) Time domain transmission resources of a PUSCH indicated by a second row index in the time domain resource allocation list associated with the non-fallback DCI format, where the second row index indicates time domain transmission resources of a plurality of PUSCHs, and transmission lengths of the plurality of PUSCHs are the same.

For example, after determining to use the time domain resource allocation list associated with the non-fallback DCI format, the user/terminal UE can only use a row index (row index) scheduling a plurality of PUSCHs with the same transmission length.

Figure 3B:
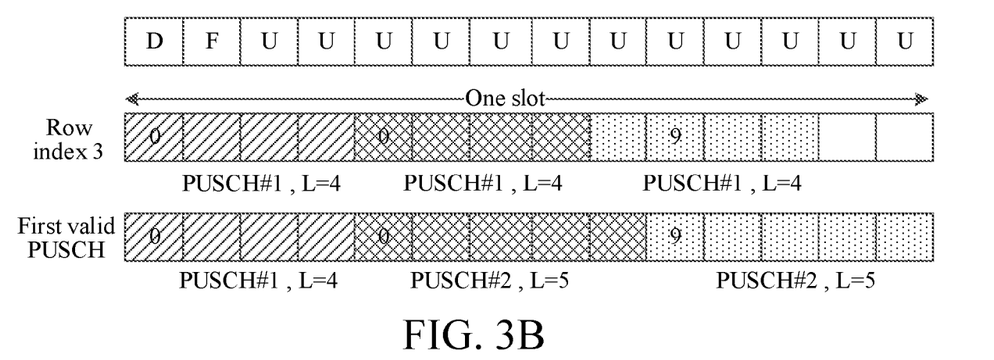
FIG. 3B is a schematic diagram of a time domain resource allocation list in an instance 2 of this application.

For example, in the time domain resource allocation list associated with the DCI format 0_1 shown in FIG. 3B, U represents an uplink slot, D represents a downlink slot, and F represents a flexible slot. When retransmission of PUSCH #2 is performed, time domain transmission resources of a plurality of PUSCHs with the same transmission length (L=4) indicated by a row index 3 may be selected, and a downlink (D) slot exists in the first time domain transmission resource, so that the first time domain transmission resource is discarded; or retransmission of the PUSCH #2 may be performed by using time domain resources of the first valid PUSCH with a transmission length of 5, and time domain transmission resources before the first PUSCH are invalid due to existence of the downlink (D) slot.

Optionally, in a case that one CG PUSCH that fails to be transmitted before is retransmitted, cases that the terminal determines to use a time domain resource allocation list associated with a fallback DCI format may include any one of the following:

1) in a case that the time domain resource allocation list associated with the fallback DCI format is configured or the time domain resource allocation list associated with the non-fallback DCI format and the time domain resource allocation list associated with the fallback DCI format are configured simultaneously, determining to use the time domain resource allocation list associated with the fallback DCI format; or 2) in a case that a preset high-layer parameter is configured for the terminal, determining to use the time domain resource allocation list associated with the fallback DCI format, where the preset high-layer parameter is used for limiting the terminal to supporting the time domain resource allocation list associated with the non-fallback DCI format.

In the embodiments of this application, in a case that the transmission scheduled by the first DCI is retransmission and the scrambling identifier of the first DCI is the CS-RNTI, in a case that the terminal supports retransmitting a plurality of CG PUSCHs that fail to be transmitted before and index numbers of hybrid automatic repeat request (HARQ) processes of the plurality of CG PUSCHs that fail to be transmitted before are continuously increased or continuously decreased by using 1 as a step, the terminal determines to use the time domain resource allocation list associated with the non-fallback DCI format.

Further, after determining to use the time domain resource allocation list associated with the non-fallback DCI format, the terminal may retransmit the plurality of CG PUSCHs that fail to be transmitted before by using time domain transmission resources of a PUSCH indicated by a third row index in the time domain resource allocation list associated with the non-fallback DCI format, where the third row index is indicated by the first DCI, and the number of the time domain transmission resources of the PUSCH indicated by the third row index is greater than or equal to the number of the CG PUSCHs that fail to be transmitted before.

For example, for a case that the Type 1 CG PUSCH and/or the Type 2 CG PUSCH are configured on a NR unlicensed band, in a case that the DCI in the non-fallback DCI format such as the DCI format 0_1 received by the UE is used for scheduling retransmission of the Type 1 or Type 2 CG PUSCH, and at least one row index in the time domain resource allocation list configured by the high layer and associated with the DCI format 0_1 indicates that time domain transmission resources (S, L) of a plurality of different PUSCHs are included:

(1) In a case that the retransmission of the CG PUSCH only supports retransmitting one CG PUSCH that fails to be transmitted before, the UE determines to use the time domain resource allocation list associated with the non-fallback DCI format, or determines to use a time-domain resource allocation list associated with a fallback DCI format. A specific manner is shown above, and details are not described herein again.

(2) In a case that the indexes of the HARQ processes of the plurality of CG PUSCHs that fail to be transmitted before are continuously increased or continuously decreased by using 1 as a step, the retransmission may support the plurality of CG PUSCHs that fail to be transmitted before, or otherwise only support retransmitting one CG PUSCH that fails to be transmitted before. That is, in a case that a plurality of SLIVs exist in a resource allocation list indicated by the base station, it indicates that HARQ process numbers (HARQ Process Number, HPN) of the plurality of retransmitted PUSCHs are continuous; or otherwise, the base station can only indicate a single SLIV and cannot indicate a plurality of SLIVs in the resource allocation list.

In an implementation, in a case that a plurality of CG PUSCHs whose HARQ process numbers are continuous are retransmitted, each scheduled retransmitted CG-PUSCH has an independent pair of (S, L), and L of the plurality of PUSCHs may be the same or may be different.

In the embodiments of this application, in a case that the transmission scheduled by the first DCI is retransmission and the scrambling identifier of the first DCI is the CS-RNTI, the terminal may determine to use a time domain resource allocation list associated with a non-fallback DCI format (namely, the DCI format of the first DCI). A first CG PUSCH is then retransmitted by using first time domain transmission resources according to a plurality of first indication fields included in the first DCI, and a second CG PUSCH and second time domain transmission resources corresponding to the second CG PUSCH are ignored, where each of the first indication fields corresponds to one CG PUSCH, a first indication field corresponding to the first CG PUSCH is a preset value, and a first indicator field corresponding to the second CG PUSCH is not a preset value; and the first time domain transmission resources and the second time domain transmission resources are resources in time domain transmission resources of a PUSCH indicated by a fourth row index indicated by the first DCI in the time domain resource allocation list associated with the non-fallback DCI format.

Optionally, the first indicator field may be a new data indication (New Data Indication, NDI) field or may be another field, which is not limited herein.

For example, in a case that retransmission of CG PUSCHs may support retransmitting one or a plurality of CG PUSCHs that fail to be transmitted before, in the DCI scheduling the retransmission, each PUSCH has an independent NDI field and redundancy version (RV) field. In a case that NDI is equal to 1 (and RV is not equal to 0), resources of a PUSCH corresponding to retransmission by the UE is indicated by a corresponding SLIV; and in a case that NDI is equal to 0 (and RV is equal to 0), the UE ignores a corresponding PUSCH and ignores an SLIV corresponding to the PUSCH.

As an optional embodiment, for a case that a band configured with the cg-nrofPUSCH-InSlot-r16 and the cg-nrofSlots-r16 and/or in which the PUSCH is located is an unlicensed band, a resource allocation method for a PUSCH associated with the DCI format 0_1 scrambled by a CS-RNTI for activation (Activation) may be the same as or different from a resource allocation method for a PUSCH associated with the DCI format 0_1 scrambled by a CS-RNTI for retransmission.

For example, for a case that a band configured with the cg-nrofPUSCH-InSlot-r16 and the cg-nrofSlots-r16 and/or in which the PUSCH is located is an unlicensed band, a resource allocation list of a PUSCH associated with the DCI format 0_1 scrambled by a CS-RNTI for Activation is the same as the resource allocation list of the PUSCH associated with the DCI format 0_0, or is a resource allocation list of a single PUSCH (in a case that resource allocation lists are configured for single and multi PUSCHs); and a resource allocation list of a PUSCH associated with the DCI format 0_1 scrambled by a CS-RNTI for retransmission is the same as the resource allocation list of the PUSCH associated with the DCI format 0_1, or is a resource allocation list of multi PUSCHs (in a case that resource allocation lists are configured for single and multi PUSCHs).

It should be noted that, an execution entity of the resource determining method provided in the embodiments of this application may be a resource determining apparatus or a control module configured to perform the resource determining method in the resource determining apparatus. The resource determining apparatus provided in the embodiments of this application is described by using an example in which the resource determining method is performed by the resource determining apparatus in the embodiments of this application.

Figure 4:
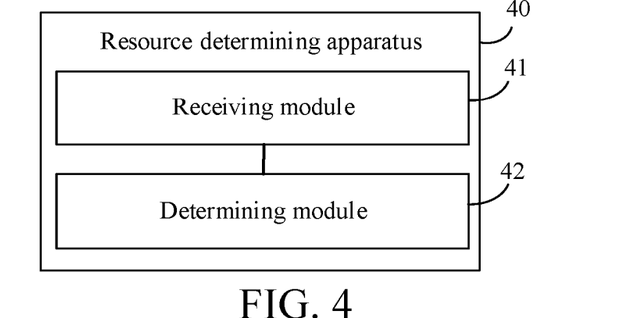
FIG. 4 is a schematic structural diagram of a resource determining apparatus according to an embodiment of this application.

Referring to FIG. 4, FIG. 4 is a schematic structural diagram of a resource determining apparatus according to an embodiment of this application, which is applied to a terminal. As shown in FIG. 4, the resource determining apparatus 40 includes:

a receiving module 41, configured to receive first DCI, where the first DCI is in a non-fallback DCI format, and at least one row index in a time domain resource allocation list associated with the non-fallback DCI format indicates time domain transmission resources of a plurality of PUSCHs; and the first DCI is used for scheduling transmission of the PUSCHs on an unlicensed band; and a determining module 42, configured to determine a time domain resource allocation list used for transmitting the PUSCHs according to the following content: whether the transmission scheduled by the first DCI is first transmission or retransmission and a scrambling identifier of the first DCI.

Optionally, in a case that the transmission scheduled by the first DCI is first transmission and the scrambling identifier of the first DCI is a CS-RNTI or an SP-CSI-RNTI, the determining module 42 is specifically configured to:

determine to use the time domain resource allocation list associated with the non-fallback DCI format; or determine to use a time domain resource allocation list associated with a fallback DCI format.

Optionally, after the determining to use the time domain resource allocation list associated with the non-fallback DCI format, the apparatus further includes:

a transmission module, configured to transmit, after determining to use the time domain resource allocation list associated with the non-fallback DCI format, CG PUSCHs or PUSCHs carrying SP-CSI by using at least one of the following:

time domain transmission resources of a predefined PUSCH in the time domain resource allocation list associated with the non-fallback DCI format;

time domain transmission resources of a PUSCH indicated by a first row index in the time domain resource allocation list associated with the non-fallback DCI format, where the first row index indicates time domain transmission resources of one PUSCH; and time domain transmission resources of a PUSCH indicated by a second row index in the time domain resource allocation list associated with the non-fallback DCI format, where the second row index indicates time domain transmission resources of a plurality of PUSCHs and transmission lengths of the plurality of PUSCHs are the same.

Optionally, the predefined PUSCH is any one of the following:

a first PUSCH indicated by the time domain resource allocation list associated with the non-fallback DCI format; or a first valid PUSCH indicated by the time domain resource allocation list associated with the non-fallback DCI format.

Optionally, the determining module 42 is further configured to perform any one of the following:

in a case that the time domain resource allocation list associated with the fallback DCI format is configured or the time domain resource allocation list associated with the non-fallback DCI format and the time domain resource allocation list associated with the fallback DCI format are configured simultaneously, determining to use the time domain resource allocation list associated with the fallback DCI format; or in a case that a preset high-layer parameter is configured, determining to use the time domain resource allocation list associated with the fallback DCI format, where the preset high-layer parameter is used for limiting the terminal to supporting the time domain resource allocation list associated with the non-fallback DCI format.

Optionally, in a case that the transmission scheduled by the first DCI is retransmission and the scrambling identifier of the first DCI is a CS-RNTI, the determining module 42 is specifically configured to:

in a case that the terminal supports retransmitting one CG PUSCH that fails to be transmitted before, determine to use the time domain resource allocation list associated with the non-fallback DCI format, or determine to use a time domain resource allocation list associated with a fallback DCI format.

Optionally, the resource determining apparatus 40 further includes:

a first retransmission module, configured to retransmit, after determining to use the time domain resource allocation list associated with the non-fallback DCI format, the CG PUSCH that fails to be transmitted before by using at least one of the following:

time domain transmission resources of a predefined PUSCH in the time domain resource allocation list associated with the non-fallback DCI format;

time domain transmission resources of a PUSCH indicated by a first row index in the time domain resource allocation list associated with the non-fallback DCI format, where the first row index indicates time domain transmission resources of one PUSCH; and time domain transmission resources of a PUSCH indicated by a second row index in the time domain resource allocation list associated with the non-fallback DCI format, where the second row index indicates time domain transmission resources of a plurality of PUSCHs and transmission lengths of the plurality of PUSCHs are the same.

Optionally, in a case that the transmission scheduled by the first DCI is retransmission and the scrambling identifier of the first DCI is a CS-RNTI, the determining module 42 is specifically configured to:

in a case that the terminal supports retransmitting a plurality of CG PUSCHs that fail to be transmitted before and index numbers of HARQ processes of the plurality of CG PUSCHs that fail to be transmitted before are continuously increased or continuously decreased by using 1 as a step, determine to use the time domain resource allocation list associated with the non-fallback DCI format.

Optionally, the resource determining apparatus 40 further includes:

a second retransmission module, configured to retransmit, after determining to use the time domain resource allocation list associated with the non-fallback DCI format, the plurality of CG PUSCHs that fail to be transmitted before by using time domain transmission resources of a PUSCH indicated by a third row index in the time domain resource allocation list associated with the non-fallback DCI format, where the third row index is indicated by the first DCI, and the number of the time domain transmission resources of the PUSCH indicated by the third row index is greater than or equal to the number of the CG PUSCHs that fail to be transmitted before.

Optionally, in a case that the transmission scheduled by the first DCI is retransmission and the scrambling identifier of the first DCI is a CS-RNTI, the determining module 42 is specifically configured to:

determine to use the time domain resource allocation list associated with the non-fallback DCI format.

Further, the resource determining apparatus 40 further includes:

a processing module, configured to retransmit a first CG PUSCH by using first time domain transmission resources according to a plurality of first indication fields included in the first DCI, and ignore a second CG PUSCH and second time domain transmission resources corresponding to the second CG PUSCH, where each of the first indication fields corresponds to one CG PUSCH, a first indication field corresponding to the first CG PUSCH is a preset value, and a first indication field corresponding to the second CG PUSCH is not a preset value; and the first time domain transmission resources and the second time domain transmission resources are resources in time domain transmission resources of a PUSCH indicated by a fourth row index indicated by the first DCI in the time domain resource allocation list associated with the non-fallback DCI format.

The resource determining apparatus in the embodiments of this application may be an apparatus, or may be a component, an integrated circuit, or a chip in the terminal. The apparatus may be a mobile terminal or a non-mobile terminal. For example, the mobile terminal may include, but not limited to, the types of the terminal 11 listed above. The non-mobile terminal may be a server, a network attached storage (NAS), a personal computer (PC), a television (TV), a teller machine, or a self-service machine, which is not specifically limited in the embodiments of this application.

The resource determining apparatus in the embodiments of this application may be an apparatus with an operating system. The operating system may be an Android (Android) operating system, may be an ios operating system, or may be another possible operating system, which is not specifically limited in the embodiments of this application.

The resource determining apparatus 40 provided in the embodiments of this application can implement various processes implemented in the method embodiment shown in FIG. 2 and achieve the same technical effects. To avoid repetition, details are not described herein again.

Figure 5:
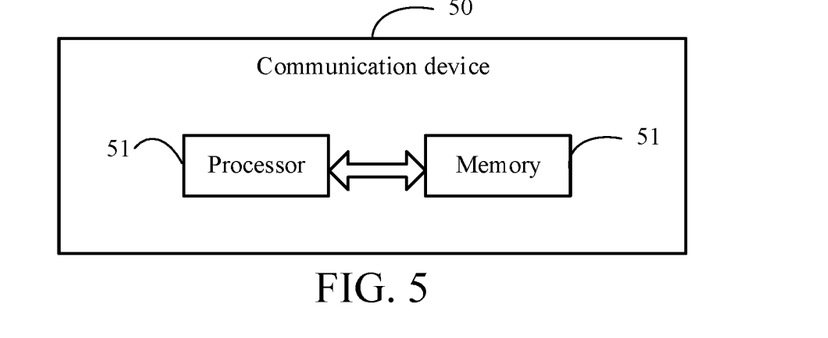
FIG. 5 is a schematic structural diagram of a terminal according to an embodiment of this application.

Optionally, as shown in FIG. 5, an embodiment of this application further provides a terminal 50, including a processor 51, a memory 52, and a program or instruction stored on the memory 52 and executable on the processor 51, where when executed by the processor 51, the program or instruction implements the various processes of the method embodiment shown in FIG. 2, and can achieve the same technical effects. To avoid repetition, details are not described herein again.

Figure 6:
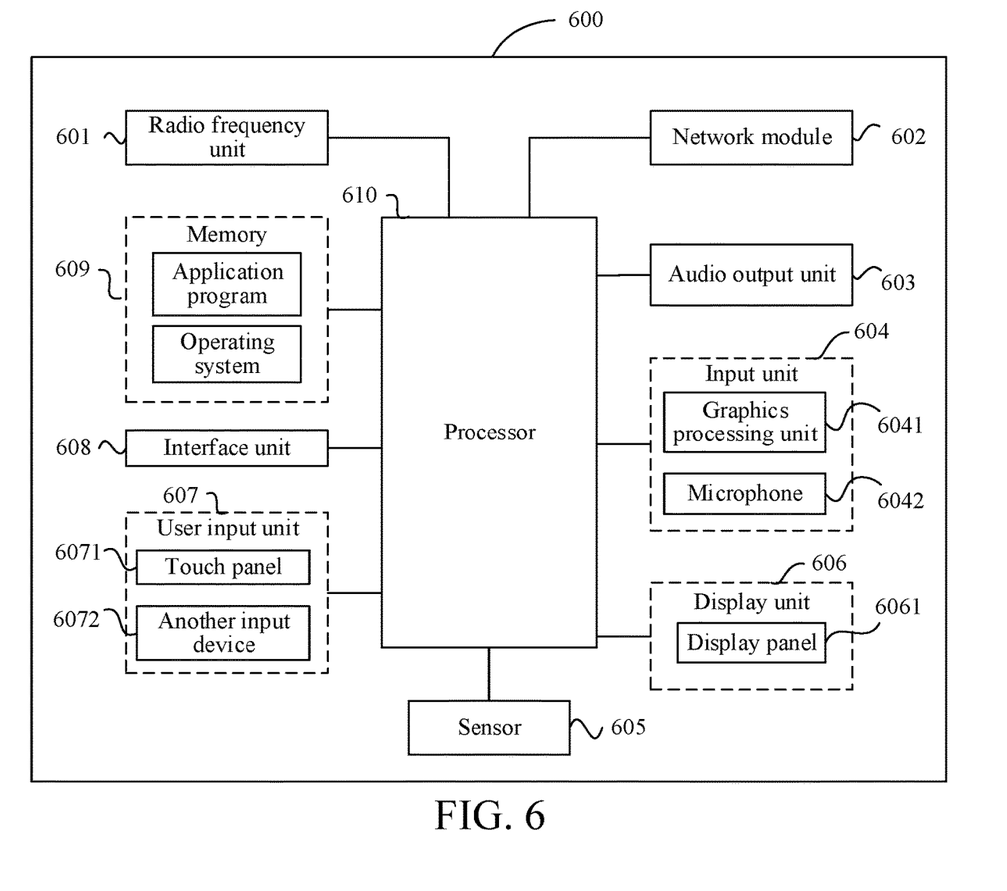
FIG. 6 is a schematic structural diagram of another terminal according to an embodiment of this application.

FIG. 6 is a schematic diagram of a hardware structure of a terminal implementing various embodiments of this application.

The terminal 600 includes, but not limited to, components such as a radio frequency unit 601, a network module 602, an audio output unit 603, an input unit 604, a sensor 605, a display unit 606, a user input unit 607, an interface unit 608, a memory 609, and a processor 610.

A person skilled in the art may understand that, the terminal 600 may further include a power supply (such as a battery) for supplying power to the components. The power supply may be logically connected to the processor 610 by using a power management system, thereby implementing functions such as charging, discharging, and power consumption management by using the power management system. The terminal structure shown in FIG. 6 does not constitute a limitation to the terminal, and the terminal may include more or fewer components than those shown in the figure, or some components may be combined, or a different component deployment may be used, which is not described herein again.

It should be understood that, in the embodiments of this application, the input unit 604 may include a graphics processing unit (GPU) 6041 and a microphone 6042. The graphics processing unit 6041 performs processing on image data of a static picture or a video that is obtained by an image acquisition device (for example, a camera) in a video acquisition mode or an image acquisition mode. The display unit 606 may include a display panel 6061, and for example, the display panel 6061 may be configured in a form such as a liquid crystal liquid display or an organic light-emitting diode. The user input unit 607 includes a touch panel 6071 and another input device 6072. The touch panel 6071 may be also referred to as a touch screen. The touch panel 6071 may include two parts: a touch detection apparatus and a touch controller. The another input device 6072 may include, but not limited to, a physical keyboard, a functional key (such as a volume control key or a switch key), a track ball, a mouse, or a joystick, which is not described herein again.

In the embodiments of this application, after receiving downlink data from a network-side device, the radio frequency unit 601 transmits the downlink data to the processor 610 for processing. In addition, uplink data is sent to the network-side device. Generally, the radio frequency unit 601 includes, but not limited to, an antenna, at least one amplifier, a transceiver, a coupler, a low noise amplifier, or a duplexer.

The memory 609 may be configured to store a software program or instructions and various data. The memory 609 may mainly include a program or instruction storage area and a data storage area. The program or instruction storage area may store an operating system, an application program or instruction required by at least one function (such as a sound playback function and an image display function), and the like. In addition, the memory 609 may include a high-speed random access memory, and may further include a non-volatile memory. The non-volatile memory may be a read-only memory (ROM), a programmable ROM (PROM), an erasable PROM (EPROM), an electrically EPROM (EEPROM), or a flash memory. For example, the non-volatile memory may be at least one magnetic disk storage device, a flash memory device, or other volatile solid-state storage devices.

The processor 610 may include one or more processing units. Optionally, the processor 610 may integrate an application processor and a modem processor. The application processor mainly processes an operating system, a user interface, and an application program or instruction. The modem processor mainly processes wireless communication, and for example, a baseband processor. It may be understood that the foregoing modem processor may either not be integrated into the processor 610.

The radio frequency unit 601 is configured to receive first DCI, where the first DCI is in a non-fallback DCI format, and at least one row index in a time domain resource allocation list associated with the non-fallback DCI format indicates time domain transmission resources of a plurality of PUSCHs; and the first DCI is used for scheduling transmission of the PUSCHs on an unlicensed band; and the processor 610 is configured to determine a time domain resource allocation list used for transmitting the PUSCHs according to the following content: whether the transmission scheduled by the first DCI is first transmission or retransmission and a scrambling identifier of the first DCI.

The terminal 600 provided in this embodiment of this application can implement various processes implemented in the method embodiment shown in FIG. 2 and achieve the same technical effects. To avoid repetition, details are not described herein again.

An embodiment of this application further provides a readable storage medium, storing a program or instruction, where when executed by a processor, the program or instruction implements the processes of the method embodiment shown in FIG. 2, and can achieve the same technical effects. To avoid repetition, details are not described herein again.

The processor is the processor in the terminal described in the foregoing embodiment. The readable storage medium may include a computer-readable storage medium, such as a computer read-only memory (ROM), a random access memory (RAM), a magnetic disk, or an optical disc.

An embodiment of this application further provides a chip, including a processor and a communication interface, where the communication interface is coupled to the processor, and the processor is configured to run a network-side device program or instruction, to implement the processes of the method embodiment shown in FIG. 2 and achieve the same technical effects. To avoid repetition, details are not described herein again.

It should be understood that, the chip mentioned in this embodiment of this application may also be referred to as a system-level chip, a system chip, a chip system, or a system on chip.

It may be understood that the embodiments described in this application may be implemented by hardware, software, firmware, middleware, microcode, or a combination thereof. For hardware implementation, modules, units, submodules, and subunits may be implemented in one or more application specific integrated circuits (ASICs), digital signal processors (DSPs), DSP devices (DSPDs), programmable logic devices (PLDs), field-programmable gate arrays (FPGAs), general-purpose processors, controllers, microcontrollers, microprocessors, other electronic units configured to implement the functions of this application, or a combination thereof.

It should be noted that, the terms "include", "comprise", and any variants thereof are intended to cover a non-exclusive inclusion. Therefore, in the context of a process, method, object, or apparatus that includes a series of elements, the process, method, object, or apparatus not only includes such elements, but also includes other elements not clearly listed, or may include inherent elements of the process, method, object, or apparatus. Without more limitations, elements defined by the sentence "including one" does not exclude that there are still other same elements in the process, method, object, or apparatus. In addition, it should be noted that, in the implementations of this application, ranges of the method and the apparatus are not limited to those shown in the specification or the functions may be performed according to a discussed order, and the functions may be also performed simultaneously or in a reverse order according to the involved functions. For example, the described method may be performed in a sequence different from the described sequence, and various steps may be further added, omitted, or combined. In addition, features described with reference to some examples may be combined in other examples.

According to the descriptions of the foregoing implementations, a person skilled in the art may clearly understand that the method according to the foregoing embodiments may be implemented by software and a necessary general hardware platform, and certainly, may alternatively be implemented by hardware, but in many cases, the former manner is a better implementation. Based on such an understanding, the technical solutions in this application essentially or the part contributing to the related art may be implemented in the form of a software product. The computer software product is stored in a storage medium (for example, a ROM/RAM, a magnetic disk, or an optical disc), and includes several instructions for instructing a terminal (which may be a mobile phone, a computer, a server, an air conditioner, or a network device) to perform the method described in the embodiments of this application.

The embodiments of this application have been described above with reference to the accompanying drawings. However, this application is not limited to the specific implementations described above, and the specific implementations are merely exemplary and not limitative. A person of ordinary skill in the art may make various forms under the teaching of this application without departing from the concept of this application and the protection scope of the claims, and such forms shall all fall within the protection scope of this application.

What is claimed is:

1. A resource determining method performed by a terminal, comprising:
   receiving first downlink control information (DCI), wherein the first DCI is in a non-fallback DCI format, and at least one row index in a time domain resource allocation list associated with the non-fallback DCI format indicates time domain transmission resources of a plurality of physical uplink shared channels (PUSCHs); and the first DCI is used for scheduling transmission of the PUSCHs on an unlicensed band; and
   determining the time domain resource allocation list used for transmitting the PUSCHs according to the following content: whether the transmission scheduled by the first DCI is a first transmission or retransmission, and a scrambling identifier of the first DCI; wherein
   in a case that the transmission scheduled by the first DCI is the first transmission and the scrambling identifier of the first DCI is a configured scheduling-radio network temporary identifier (CS-RNTI), the determining the time domain resource allocation list used for transmitting the PUSCHs comprises:
   determining to use the time domain resource allocation list associated with the non-fallback DCI format.

2. The method according to claim 1, wherein after the determining to use the time domain resource allocation list associated with the non-fallback DCI format, the method further comprises:
   transmitting configured grant (CG) PUSCHs by using the following:
   time domain transmission resources of a PUSCH indicated by a first row index in the time domain resource allocation list associated with the non-fallback DCI format, wherein the first row index indicates time domain transmission resources of one PUSCH.

3. The method according to claim 1, wherein in a case that the transmission scheduled by the first DCI is retransmission and the scrambling identifier of the first DCI is a CS-RNTI, the determining the time domain resource allocation list used for transmitting the PUSCHs comprises:
   in a case that the terminal supports retransmitting one CG PUSCH that fails to be transmitted before, determining to use the time domain resource allocation list associated with the non-fallback DCI format, or determining to use the time domain resource allocation list associated with a fallback DCI format.

4. The method according to claim 3, wherein after the determining to use the time domain resource allocation list associated with the non-fallback DCI format, the method further comprises:
   retransmitting the CG PUSCH that fails to be transmitted before by using at least one of the following:

time domain transmission resources of a predefined PUSCH in the time domain resource allocation list associated with the non-fallback DCI format;

time domain transmission resources of a PUSCH indicated by a first row index in the time domain resource allocation list associated with the non-fallback DCI format, wherein the first row index indicates time domain transmission resources of one PUSCH; or time domain transmission resources of a PUSCH indicated by a second row index in the time domain resource allocation list associated with the non-fallback DCI format, wherein the second row index indicates time domain transmission resources of a plurality of PUSCHs and transmission lengths of the plurality of PUSCHs are the same.

5. The method according to claim 1, wherein in a case that the transmission scheduled by the first DCI is retransmission and the scrambling identifier of the first DCI is a CS-RNTI, the determining the time domain resource allocation list used for transmitting the PUSCHs comprises:

in a case that the terminal supports retransmitting a plurality of CG PUSCHs that fail to be transmitted before and index numbers of hybrid automatic repeat request HARQ processes of the plurality of CG PUSCHs that fail to be transmitted before are continuously increased or continuously decreased by using 1 as a step, determining to use the time domain resource allocation list associated with the non-fallback DCI format.

6. The method according to claim 5, wherein after the determining to use the time domain resource allocation list associated with the non-fallback DCI format, the method further comprises:

retransmitting the plurality of CG PUSCHs that fail to be transmitted before by using time domain transmission resources of a PUSCH indicated by a third row index in the time domain resource allocation list associated with the non-fallback DCI format, wherein the third row index is indicated by the first DCI, and the number of the time domain transmission resources of the PUSCH indicated by the third row index is greater than or equal to the number of the CG PUSCHs that fail to be transmitted before.

7. The method according to claim 1, wherein in a case that the transmission scheduled by the first DCI is retransmission and the scrambling identifier of the first DCI is a CS-RNTI, the determining the time domain resource allocation list used for transmitting the PUSCHs comprises:

determining to use the time domain resource allocation list associated with the non-fallback DCI format; and after the determining to use the time domain resource allocation list associated with the non-fallback DCI format, the method further comprises:

retransmitting a first CG PUSCH by using first time domain transmission resources according to a plurality of first indication fields comprised in the first DCI, and ignoring a second CG PUSCH and second time domain transmission resources corresponding to the second CG PUSCH, wherein each of the first indication fields corresponds to one CG PUSCH, a first indication field corresponding to the first CG PUSCH is a preset value, and a first indication field corresponding to the second CG PUSCH is not a preset value; and the first time domain transmission resources and the second time domain transmission resources are resources in time domain transmission resources of a PUSCH indicated by a fourth row index indicated by the first DCI in the time domain resource allocation list associated with the non-fallback DCI format.

8. A terminal, comprising:

a processor; and a memory storing a program or instruction that is executable on the processor, wherein the program or instruction, when executed by the processor, causes the terminal to perform the following steps:

receiving first downlink control information (DCI), wherein the first DCI is in a non-fallback DCI format, and at least one row index in a time domain resource allocation list associated with the non-fallback DCI format indicates time domain transmission resources of a plurality of physical uplink shared channels (PUSCHs); and the first DCI is used for scheduling transmission of the PUSCHs on an unlicensed band; and determining the time domain resource allocation list used for transmitting the PUSCHs according to the following content: whether the transmission scheduled by the first DCI is a first transmission or retransmission, and a scrambling identifier of the first DCI; wherein in a case that the transmission scheduled by the first DCI is the first transmission and the scrambling identifier of the first DCI is a configured scheduling-radio network temporary identifier (CS-RNTI), the determining the time domain resource allocation list used for transmitting the PUSCHs comprises:

determining to use the time domain resource allocation list associated with the non-fallback DCI format.

9. The terminal according to claim 8, wherein after the determining to use the time domain resource allocation list associated with the non-fallback DCI format, the program or instruction, when executed by the processor, causes the terminal to further perform the following steps:

transmitting configured grant (CG) PUSCHs by using the following:

time domain transmission resources of a PUSCH indicated by a first row index in the time domain resource allocation list associated with the non-fallback DI format, wherein the first row index indicates time domain transmission resources of one PUSCH.

10. The terminal according to claim 8, wherein in a case that the transmission scheduled by the first DCI is retransmission and the scrambling identifier of the first DCI is a CS-RNTI, the determining the time domain resource allocation list used for transmitting the PUSCHs comprises:

in a case that the terminal supports retransmitting one CG PUSCH that fails to be transmitted before, determining to use the time domain resource allocation list associated with the non-fallback DCI format, or determining to use the time domain resource allocation list associated with a fallback DCI format.

11. The terminal according to claim 10, wherein after the determining to use the time domain resource allocation list associated with the non-fallback DCI format, the program or instruction, when executed by the processor, causes the terminal to further perform the following steps:

retransmitting the CG PUSCH that fails to be transmitted before by using at least one of the following:

time domain transmission resources of a predefined PUSCH in the time domain resource allocation list associated with the non-fallback DCI format;

time domain transmission resources of a PUSCH indicated by a first row index in the time domain resource allocation list associated with the non-fallback DCI format, wherein the first row index indicates time domain transmission resources of one PUSCH; or time domain transmission resources of a PUSCH indicated by a second row index in the time domain resource allocation list associated with the non-fallback DCI format, wherein the second row index indicates time domain transmission resources of a plurality of PUSCHs and transmission lengths of the plurality of PUSCHs are the same.

12. The terminal according to claim 8, wherein in a case that the transmission scheduled by the first DCI is retransmission and the scrambling identifier of the first DCI is a CS-RNTI, the determining the time domain resource allocation list used for transmitting the PUSCHs comprises:

in a case that the terminal supports retransmitting a plurality of CG PUSCHs that fail to be transmitted before and index numbers of hybrid automatic repeat request HARQ processes of the plurality of CG PUSCHs that fail to be transmitted before are continuously increased or continuously decreased by using 1 as a step, determining to use the time domain resource allocation list associated with the non-fallback DCI format.

13. The terminal according to claim 12, wherein after the determining to use the time domain resource allocation list associated with the non-fallback DCI format, the program or instruction, when executed by the processor, causes the terminal to further perform the following steps:

retransmitting the plurality of CG PUSCHs that fail to be transmitted before by using time domain transmission resources of a PUSCH indicated by a third row index in the time domain resource allocation list associated with the non-fallback DCI format, wherein the third row index is indicated by the first DCI, and the number of the time domain transmission resources of the PUSCH indicated by the third row index is greater than or equal to the number of the CG PUSCHs that fail to be transmitted before.

14. The terminal according to claim 8, wherein in a case that the transmission scheduled by the first DCI is retransmission and the scrambling identifier of the first DCI is a CS-RNTI, the determining the time domain resource allocation list used for transmitting the PUSCHs comprises:

determining to use the time domain resource allocation list associated with the non-fallback DCI format; and after the determining to use the time domain resource allocation list associated with the non-fallback DCI format, the method further comprises:

retransmitting a first CG PUSCH by using first time domain transmission resources according to a plurality of first indication fields comprised in the first DCI, and ignoring a second CG PUSCH and second time domain transmission resources corresponding to the second CG PUSCH, wherein each of the first indication fields corresponds to one CG PUSCH, a first indication field corresponding to the first CG PUSCH is a preset value, and a first indication field corresponding to the second CG PUSCH is not a preset value; and the first time domain transmission resources and the second time domain transmission resources are resources in time domain transmission resources of a PUSCH indicated by a fourth row index indicated by the first DCI in the time domain resource allocation list associated with the non-fallback DCI format.

15. The method according to claim 1, wherein the transmission of the PUSCHs is a Type2 CG PUSCH transmission.

16. The method according to claim 1, wherein in a case that the transmission scheduled by the first DCI is retransmission and the scrambling identifier of the first DCI is a CS-RNTI, the determining the time domain resource allocation list used for transmitting the PUSCH comprises:

determining to use the time domain resource allocation list associated with the non-fallback DCI format.

17. The method according to claim 16, wherein the transmission of the PUSCHs is a Type1 CG PUSCH transmission or a Type2 CG PUSCH transmission.

18. The terminal according to claim 8, wherein the transmission of the PUSCHs is a Type2 CG PUSCH transmission.

19. The terminal according to claim 8, wherein in a case that the transmission scheduled by the first DCI is retransmission and the scrambling identifier of the first DCI is a CS-RNTI, the determining the time domain resource allocation list used for transmitting the PUSCH comprises:

determining to use the time domain resource allocation list associated with the non-fallback DCI format.

20. The terminal according to claim 19, wherein the transmission of the PUSCHs is a Type1 CG PUSCH transmission or a Type2 CG PUSCH transmission.

* * * * *